INVENTOR
Junnosuke Yamamoto
ATTORNEY 3,542,534
PROCESS FOR PELLETIZING GLASSMAKING MATERIALS
Junnosuke Yamamoto, 49 3-chome, Ogikubo, Tokyo, Japan
Continuation-in-part of application Ser. No. 486,546, Sept. 10, 1965. This application Mar. 10, 1969, Ser. No. 805,643
Int. Cl. C03b 5/16, 3/04
U.S. Cl. 65—27                                      4 Claims

ABSTRACT OF THE DISCLOSURE

Process for increasing the speed and uniformity in the production of glass wherein the glass constituents, mainly silica, limestone, sodium carbonate and sodium hydroxide, with sodium hydroxide furnishing at least 20% by weight of the $Na_2O$ equivalent present, are initially pulverized to fine powders having particle sizes within preferred ranges, far smaller than customary in the art, preferably less than 0.42 mm., with 60% to 65% thereof finer than about 0.15 mm. Then the powders are mixed and pelletized, without the use of special binders or of high temperatures or pressures, by tumbling or rolling in the presence of 12% to 20% by weight of water, and the pellets are dried, preferably by heated air, initially at a temperature of 50° C. to 200° C. and with subsequent drying temperatures not exceeding 700° C. The dried pellets, having a size of 4 to 20 millimeters in the largest dimension, and mixed with cullet if desired, are fed to a furnace and rapidly converted to glass of high quality.

---

Figure 1:
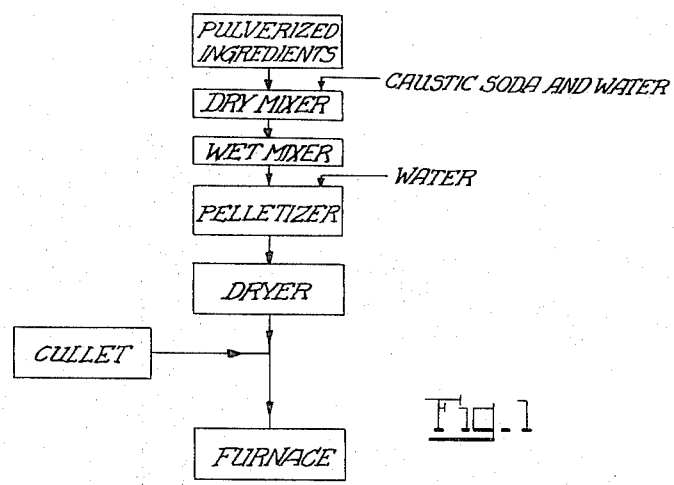

This application is a continuation-in-part of my copending application Ser. No. 486,546 filed Sept. 10, 1965 and now abandoned.

This invention relates to a process for glassmaking.

In the usual glassmaking processes, the addition of the raw materials in the form of rather coarse powders involves a great many disadvantages. Thus it is quite common that part of the material powders, which are prepared and carried to a melting furnace, disperses in a cloud of dust and soils the surroundings and the working place for glassmaking. Also, in the conveyor, or particularly in the bunker above the intake of the furnace, the powders become segregated in composition, resulting in vitrification delays in the melting furnace and, in far too many cases, loss of homogeneity of the glass product. Furthermore, dispersion of powders thrown into the furnace destroys the upper construction of the combustion chamber and the refractory blocks in the heat accumulation chamber and the heat conversion chamber. Sometimes, the powders clog the flues of these chambers and cause serious damage to the melting furnace which requires entire replacement of packing refractories. Also, variation in the water content of the powders often affects the temperature in the furnace and in no small degree damages the product by the formation of bubbles and stones.

Heretofore, a method has been proposed for preventing the dispersion of the powder dust by providing constant humidity for the powders with water. This avoids the dispersion of powders in the furnace. However, this method has produced no satisfactory results as yet.

Other attempts have been made to use alkali-resistant electrocast refractories at the side wall of the upper furnace structure, but there is no known way to prevent corrosion of the crown silica. Also, while magnesia refractories for the chamber are quite resistant to alkali dust, they cannot prevent undesirable condensation of alkali sulphate.

Speed of vitrification, that is, glass forming speed, has advanced with improvements in furnace construction, efficiency of operation by automation, and improved quality of refractory blocks, but the development seems to have reached a limit under present technical conditions. It was also thought that treatment of residual silica grain is most important since it delays reaction. Another proposal was to pulverize grains much smaller in size than ordinary, but it is impractical to pulverize them further and put them into a continuous melting furnace because of the above-mentioned disadvantages.

The pelletizing method for the granulation of powders has previously been employed in the manufacture of iron and steel by use of pressing molders, injection molding machines, drum-type granulators, and pan-pelletizers for accomplishing the granulation under various conditions. In general, however, such process has required a variety of binding agents to furnish pellets of sufficient strength. In the granulation for glassmaking, however, the application of extraneous binding agents is generally not suitable as it leaves heterogeneous components in glass as residues of the binding agents which is liable to change the composition of the glass and results in high cost of manufacture.

The present invention has for its object to provide a process for glassmaking which makes it possible to manufacture the glass by pelletizing the finely pulverized raw materials, whereby the glass product is produced at increased speed without changing the composition, but increasing the quality, of the product. This novel process is not expensive and overcomes the disadvantages of previously known glassmaking processes.

The present invention overcomes the disadvantages of the conventional mehods of glassmaking by providing for pulverizing powders having ordinary grain size into much smaller particles and then pelletizing them adequately to facilitate vitrification in the later stages of glassmaking. As such pelletizing of the finely pulverized raw materials facilitates their melting, with the particles of silica, alkali, limestone and other ingredients in close contact, vitrfication occurs more rapidly and without change in the composition of the material. The pellets of agglomerated powders for glassmaking will have the desired strength without the use of extraneous binding agents such as lignin or water glass, which are unduly expensive or may change the composition.

Figure 2:
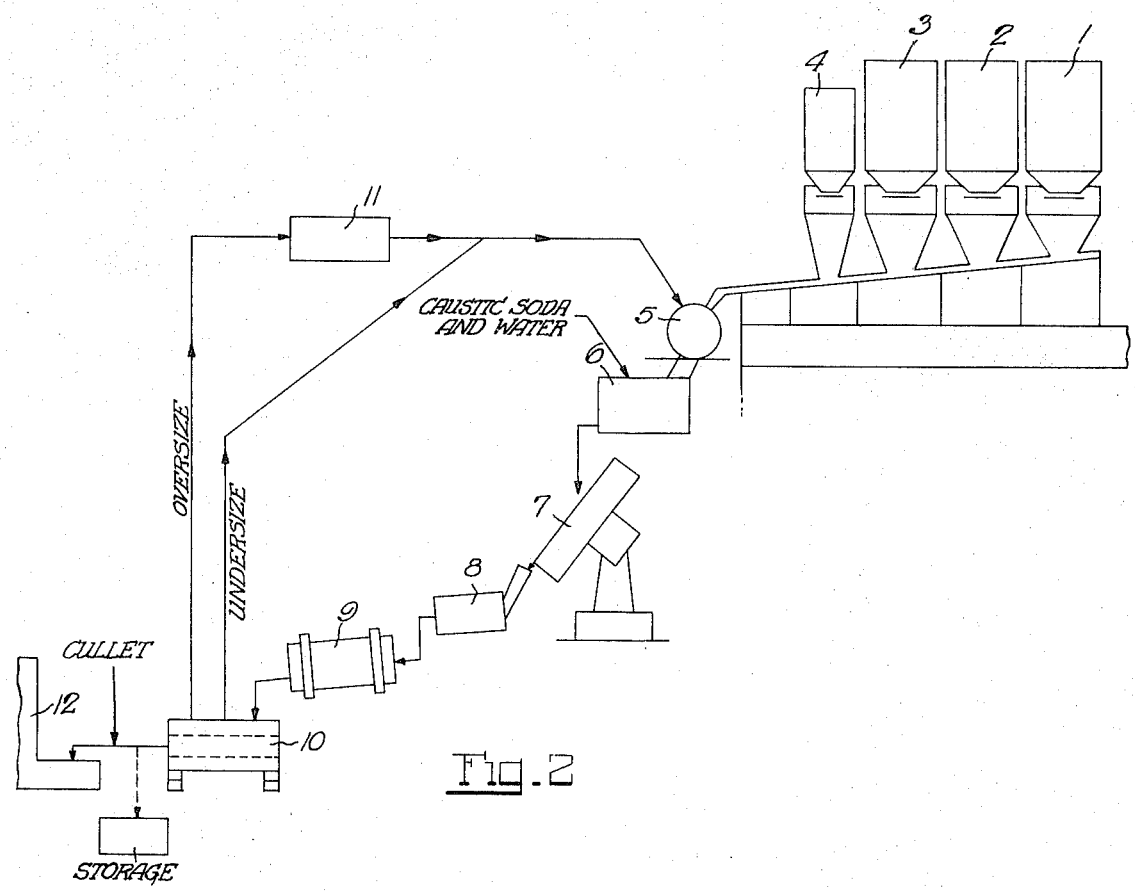

With these and other objects in view, which will become apparent in the following detailed description, the present invention will be clearly understood in connection with the accompanying drawings, in which:

FIG. 1 is a flow sheet showing the essential process steps in accordance with the invention; and FIG. 2 is a diagrammatic view of a commercial installation for carrying out a perferred embodiment in accordance with the invention.

In accordance with this invention, the raw materials for glassmaking are initially pulverized to powders within a critical range of subdivision; the subdivided powders are then thoroughly mixed, preferably by a dry mixing process; the substantially uniform mixture of particles is then agglomerated to pellets having grain sizes within an optimum range by subjecting the particles to a tumbling action, causing them to roll over one another repeatedly in the presence of a critical range of water content; and the pellets are dried at a temperature within an optimum range, thereby providing the raw material charge for the glassmaking furnace in a form which facilitates the vitrification process and furnishes the surprising advantages of this invention.

The critical ranges, which are essential in obtaining the advantages resulting from this invention, are presented in the following summary and substantiated in the detailed description below.

The raw materials, except silica sand, must all be subdivided initially to particles whose largest dimension is finer than A.S.T.M. No. 40 (0.420 mm.) with at least 65% thereof being finer than A.S.T.M. No. 100 (0.149 mm.). The silica sand ingredient is all subdivided to particles finer than A.S.T.M. No. 60 (0.250 mm.) with at least 60% thereof being finer than A.S.T.M. No. 100 (0.149 mm.). Subdivision to any significant further extent is not essential and may not provide sufficiently increased advantages to justify the added expense.

After the fine ingredient particles have been thoroughly mixed, they are readily agglomerated by rolling or tumbling action in the presence of 12 to 20% by weight of water, about 15% on the average (15 parts by weight of water per 100 parts by weight of particles). Within this critical range of moisture content, the agglomeration of particles to form rounded, compact and well-bonded pellets of the desired size range and handling characteristics proceeds smoothly and rapidly, a result which is practically unattainable at either lower or higher water contents.

The drying of the pellets of agglomerated particles for the removal of moisture by evaporation must be effected at initially moderate temperature, above 50° C. and below 200° C., preferably by means of heated air or other gas maintained at a preferred temperature of 130° C. to 180° C. The temperature in the dryer at the exit end must not exceed 700° C., for substantially higher temperatures thereat would result in stickiness of the pellets and resulting difficulty or interruption in their transportation to the melting furnace.

When the process is carried out within the above-described critical conditions, the resulting rounded pellets of agglomerated particles are between 4 and 20 millimeters in the largest dimension, and are characterized by excellent crush resistance and handling characteristics.

The said pellets are readily melted and rapidly dispersed in the glass melting furnace to produce glass of high quality.

Advantages attained in accordance with this invention are illustrated by the results obtained in the following series of comparative experiments. In this series, the composition of the ingredients and the melting conditions were identical.

The composition of solids was the following typical glassmaking mixture:

|  | Parts by wt. |
|---|---|
| Silica sand | 100 |
| Sodium carbonate | 30 |
| Limestone | 30 |
| Glauber's salt | 1 |

In Experiment 1 the powders of ordinary coarse size were mixed and tested in that form, particularly as they could not be well pelletized. In Experiments 2 to 6, sodium carbonate and limestone were pulverized into much smaller grains than ordinary size and mixed with silica sand of various grain sizes. In each case, the mixture was pelletized in the presence of 12–20% water and dried, as described above.

In Experiment 1, 200 grams of the ingredient powder mixture, and in Experiments 2–6, 200 grams of the ingredient pellets, were placed in a crucible, preheated at 600° C. for thirty minutes, and then held in an electric furnace at 1400° C. for varied periods for determining the minimum melting time required for complete melting and the disappearance of silica residues. The test piece was annealed, cut to a thickness of about 7 to 8 mm., and was then ground for observation.

The following Table I summarizes this series of comparative melting experiments and the results thereof.

TABLE I

| Experiment | Grain size — All ingredients | Grain size — Silica sand | 1,400° C.—Melting time, minutes | | | | | | | | Remarks |
|---|---|---|---|---|---|---|---|---|---|---|---|
| | | | 15 | 25 | 35 | 45 | 75 | 105 | 135 | 165 | |
| (1) | Below 8 mesh (2.38 mm.); About 15% below 100 mesh (.149 mm.). | Below 20 mesh (.84 mm.); About 9% below 100 mesh. | X | X | X | X | X | X | X | O | Control: Ordinary powdery material. |
| (2) | Below 20 mesh (.84 mm.); About 34% below 100 mesh. | Below 20 mesh; About 9% below 100 mesh. | X | X | X | X | X | X | Δ | O | Pellet. |
| (3) | Below 40 mesh (.42 mm.); About 47% below 100 mesh. | Below 40 mesh (.42 mm.); About 30% below 100 mesh. | X | X | X | X | Δ | Δ | O | O | Do. |
| (4) | Below 40 mesh; About 66% below 100 mesh. | Below 60 mesh (.25 mm.); About 60% below 100 mesh. | Δ | O | O | O | O | / | / | / | Do. |
| (5) | Below 40 mesh; About 80% below 100 mesh. | Below 80 mesh (.77 mm.); About 80% below 100 mesh. | O | O | O | O | O | / | / | / | Do. |
| (6) | Below 40 mesh; About 90% below 100 mesh. | Below 100 mesh (.149 mm.) | O | O | O | O | O | / | / | / | Do. |

X Indicates significant residual silica.
Δ Indicates slight residual silica.
O Indicates no residual silica.
/ Experiment unnecessary.

Tables II to VII present the detailed screen analysis of the initial main ingredients used in the experiments, in which the Glauber's salt (sodium sulfate) ingredient was the same standard commercial material throughout. Table II lists the grain sizes of the mixture ingredients as used in Experiment 1, while Tables III to VII list the initial particle sizes of the ingredients, which were mixed and pelletized to rounded pellets of 4 to 20 mm. largest dimension for use in the melting Experiments 2 to 6.

TABLE II.—EXPERIMENT 1 (conventional powder batch)

| Material, ASTM No. | Silica sand, wt. percent | Sodium carbonate, wt. percent | Limestone, wt. percent | Mean grain size, wt. percent |
|---|---|---|---|---|
| +8 | 0 | 0 | 0 | 0.0 |
| 8–16 | 0 | 0 | 4.2 | 0.8 |
| 16–20 | 0.2 | 1.4 | 9.4 | 22.0 |
| 20–40 | 38.8 | 40.9 | 25.0 | 36.7 |
| 40–60 | 32.8 | 27.3 | 13.6 | 28.2 |
| 60–80 | 11.3 | 13.7 | 2.6 | 10.2 |
| 80–100 | 8.0 | 5.8 | 5.3 | 7.1 |
| Total | | | | 85.2 |
| 100–120 | 4.9 | 3.6 | 5.0 | 4.7 |
| –120 | 4.0 | 7.3 | 34.9 | 10.4 |
| Total | | | | 15.1 |

TABLE III.—EXPERIMENT 2

| Material ASTM No. | Silica sand, percent | Sodium carbonate, percent | Limestone, percent | Mean grain size, percent |
|---|---|---|---|---|
| +16 | 0 | 0 | 0 | 0.0 |
| 16-20 | 0.2 | 0 | 0 | 0.1 |
| 20-40 | 38.8 | 0.4 | 0.3 | 24.5 |
| 40-60 | 32.8 | 3.8 | 2.4 | 21.7 |
| 60-80 | 11.3 | 8.6 | 6.0 | 9.8 |
| 80-100 | 8.0 | 15.2 | 13.2 | 10.4 |
| Total | | | | 66.5 |
| 100-120 | 4.9 | 17.2 | 10.4 | 8.3 |
| -120 | 4.0 | 54.8 | 67.7 | 25.5 |
| Total | | | | 33.8 |

TABLE IV.—EXPERIMENT 3

| Material, ASTM No. | Silica sand, wt. percent | Sodium carbonate, wt. percent | Limestone, wt. percent | Mean grain size, wt. percent |
|---|---|---|---|---|
| +20 | 0 | 0 | 0 | 0.0 |
| 20-40 | 0.6 | 0.4 | 0.3 | 0.6 |
| 40-60 | 39.5 | 3.8 | 2.4 | 25.9 |
| 60-80 | 17.6 | 8.6 | 6.0 | 13.7 |
| 80-100 | 12.7 | 15.2 | 13.2 | 13.3 |
| Total | | | | 53.5 |
| 100-120 | 11.8 | 17.2 | 10.4 | 12.6 |
| -120 | 17.8 | 54.8 | 67.7 | 34.1 |
| Total | | | | 46.7 |

TABLE V.—EXPERIMENT 4

| Material, ASTM No. | Silica sand, wt. percent | Sodium carbonate, wt. percent | Limestone, wt. percent | Mean grain size, wt. percent |
|---|---|---|---|---|
| +20 | 0 | 0 | 0 | 0.0 |
| 20-40 | 0 | 0.4 | 0.3 | 0.2 |
| 40-60 | 0.4 | 3.8 | 2.4 | 1.5 |
| 60-80 | 20.9 | 8.6 | 6.0 | 15.8 |
| 80-100 | 18.3 | 15.2 | 13.2 | 16.8 |
| Total | | | | 34.3 |
| 100-120 | 15.9 | 17.2 | 10.4 | 15.1 |
| -120 | 44.5 | 54.8 | 67.7 | 50.8 |
| Total | | | | 65.9 |

TABLE VI.— EXPERIMENT 5

| Material, ASTM No. | Silica sand, wt. percent | Sodium carbonate, wt. percent | Limestone, wt. percent | Mean grain size, wt. percent |
|---|---|---|---|---|
| +20 | 0 | 0 | 0 | 0.0 |
| 20-40 | 0 | 0.4 | 0.3 | 0.2 |
| 40-60 | 0 | 3.8 | 2.4 | 1.2 |
| 60-80 | 0.6 | 8.6 | 6.0 | 3.1 |
| 80-100 | 17.3 | 15.2 | 13.2 | 16.2 |
| Total | | | | 20.7 |
| 100-120 | 16.2 | 17.2 | 10.4 | 15.3 |
| -120 | 65.9 | 54.8 | 67.7 | 64.2 |
| Total | | | | 79.5 |

TABLE VII.—EXPERIMENT 6

| Material, ASTM No. | Silica sand, wt. percent | Sodium carbonate, wt. percent | Limestone, wt. percent | Mean grain size, wt. percent |
|---|---|---|---|---|
| +20 | 0 | 0 | 0 | 0.0 |
| 20-40 | 0 | 0.4 | 0.3 | 0.2 |
| 40-60 | 0 | 3.8 | 2.4 | 1.2 |
| 60-80 | 0.1 | 8.6 | 6.0 | 2.8 |
| 80-100 | 0.5 | 15.2 | 13.2 | 5.7 |
| Total | | | | 9.9 |
| 100-120 | 8.9 | 17.2 | 10.4 | 10.8 |
| -120 | 90.5 | 54.8 | 67.7 | 79.6 |
| Total | | | | 90.4 |

The above experiments show that the use of ingredient powders, excepting silica sand, finer than ASTM No. 40 and including at least about 65% by weight of particles finer than ASTM No. 100, and silica sand finer than ASTM No. 60 and including at least about 60% by weight of particles finer than ASTM No. 100, which are granulated into pellets in accordance with this invention, enables the attainment of far shorter batch-free time compared with those ordinary grain size. Thus, complete melting was rapidly obtained in Experiments 4, 5 and 6 in accordance with the invention.

In a second series of melting experiments, the ingredient powders having the same grain size were pelletized as in Experiment 4. 200 grams of pellets were then preheated for 30 minutes at 600° C., and thereafter were treated in an electric furnace at the temperatures and times listed in Table VIII. The results were as shown in the table.

TABLE VIII

| Melting time, min | 15 | 25 | 35 | 45 | 75 |
|---|---|---|---|---|---|
| Temperature, °C.: | | | | | |
| 1,250 | X | X | X | Δ | O |
| 1,300 | X | X | Δ | O | O |
| 1,350 | X | Δ | O | O | O |
| 1,400 | O | O | O | O | O |

X Significant residue of silica.
Δ Slight residue of silica.
O No silica residue.

It was found that scums disappeared more quickly even at low temperatures than with powders of ordinary grain size. This would lower the fuel cost and prolong the life of the melting furnace.

It will thus be clear that the present invention is based on the use of pellets of agglomerated particles whose melting speed is exceedingly rapid as compared with powders of ordinary grain size. Accordingly, this invention accomplishes significant reductions in the cost of glassmaking. In this invention, the powder dust is not allowed to fly about in the air and powders are not allowed to segregate during transportation, neither will dispersion of dusts occur in the melting furnace. In consequence, the invention permits the manufacture of homogeneous glass products under improved working conditions. It also permits the use of potassium carbonate or dolomite instead of sodium carbonate and limestone for the same purpose. Refining agents may be used in addition to the main constituents, and a mixture of boric compound, phosphoric compound, barium compound, and lead compound may also be used in accordance with the glass composition required.

In a preferred embodiment of this invention, the raw material ingredients were initially subdivided so as to be finer than ASTM No. 60 in mean grain size and to include over 70% by weight of a size finer than ASTM No. 100. The grain size of the silica sand was almost entirely below ASTM No. 60 with about 70% finer than ASTM No. 100, as shown in detail in Table IX. The powders were mixed with small amounts of additives and colorants. After thorough dry-mixing, rounded pellets of 4 to 20 mm. size were prepared by tumbling the mixture of particles in the presence of 12% to 20% by weight of water, and drying at an initial temperature of 130° C. to 180° C.

It has been found that in order to obtain pellets of adequate strength, recourse was had to caustic soda, preferably in liquid form. Thus, it has been found that caustic soda increased the binding characteristics of the powder ingredients to the extent that the subsequently formed pellets had the requisite strength. The crushing strength of the pellets was quite high after the pellets were dried. The caustic soda may replace all or part of the sodium carbonate, preferably in a $Na_2O$ basis in excess of at least 20%. Caustic soda may, of course, be applied either as powder or in solution.

TABLE IX

| | Parts by wt. |
|---|---|
| Silica sand | 100 |
| Sodium carbonate | 24 |
| Caustic soda | 7.5 |
| Limestone | 30 |
| Glauber's salt | 1.0 |
| Potassium bichromate | 0.03 |
| Cobalt oxide | 0.005 |
| Carbon | 0.08 |

Generally, in accordance with the flow sheet illustrated in FIG. 1 of the drawing, the above components were mixed thoroughly and then granulated in a pan pelletizer. The grains obtained were dehydrated at an exemplary initial drying temperature of 130° C. to 180° C., mixed with 40 parts of glass cullets, and charged into a continuous glass melting furnace. After melting, there was obtained excellent blue colored glass. Also, 50% more glass was obtained than the maximum amount obtained when ordinary coarse powders were charged into the same continuous glass melting furnace. It was further noted that the consumption of heating fuel was significantly reduced by this pelletizing method.

TABLE X

| Material, ASTM No. | Silica sand, wt. percent | Sodium carbonate, wt. percent | Limestone, wt. percent | Mean grain size, wt. percent |
|---|---|---|---|---|
| +20 | 0 | 0 | 0 | 0.0 |
| 20-40 | 0 | 0.1 | 0 | 0.0 |
| 40-60 | 0.3 | 3.6 | 2.5 | 1.2 |
| 60-80 | 17.4 | 7.0 | 6.1 | 13.4 |
| 80-100 | 12.3 | 14.3 | 14.3 | 13.1 |
| Total | | | | 27.7 |
| 100-120 | 14.6 | 16.2 | 12.1 | 14.4 |
| -120 | 55.4 | 58.8 | 65.0 | 57.8 |
| Total | | | | 72.2 |

A more detailed showing of a commercial installation for carrying out a preferred process in accordance with the invention is diagrammatically presented in FIG. 2.

The finely pulverized ingredients are charged into storage tanks 1, 2, 3 and 4 provided, respectively, for silica sand, soda ash, limestone, and the mixture of minor ingredients, such as Glauber's salt, cobalt oxide, potassium bichromate, and carbon.

The raw material ingredients are conveyed in the desired weight ratios, for example by the use of constant feed weighers or a conventional intermittent weighing system, and discharged into mixer 5 of any known type which efficiently and thoroughly agitates the dry particles to produce a substantially uniform mixture thereof.

The mixture is delivered for further mixing into pug mill 6, at which caustic soda in liquid state of preferably over 49% concentration, together with a certain amount of water, is added. As the moist premix of particles passes through the mill, the complete mixing of the liquid and particles takes place on their passage through the mill.

The moist mixture is delivered to the granulating apparatus, preferably a disk pelletizer 7 of known type, comprising a rotating inclined pan provided with a flow adjusting rod, suitable baffles, bottom and side scrapers and other means for smooth grain production. Sufficient additional water may again be added to the mixture to insure the maintenance of the total moisture content of the mixture within the range of 12% to 20% by weight.

The agglomerated pellets overflow from the edge of the rotating disk and pass through a re-roller 8, which may consist of an inclined rotary drum. This completes the formation of compact rounded pellets of the agglomerated particles of the raw materials in the desired size range, which are discharged into a suitable dryer 9. Drying temperatures lower than the aforementioned initial 130° C. to 180° C. require prolonged periods for the evaporation of the water content. On the other hand, initial drying temperatures higher than 200° C. produce adverse effects through sudden thermal shock tending to cause cracks which significantly reduce the crushing strength of the pellets and impair the handling characteristics.

The dried pellets are then screened in sieve 10 which delivers product having the desired optimum size within the range of 4 to 20 millimeters maximum dimension. Oversize pellets are subdivided in pulverizer 11 and returned together with undersize pellets, to the mixer 5, or even to the pug mill 6 of pelletizer 7. The 4 to 20 mm. pellets are charged into the glass furnace 12, together with admixture of glass cullets if desired, or may be delivered to storage for future use.

The provision of the finely subdivided raw materials agglomerated into compact rounded pellets, of 4 to 20 mm. maximum dimension, in accordance with this invention, has enabled the economical production of high quality glass, while overcoming the deficiencies of prior practices and proposals.

The fact that each pellet contains a mixture of fine particles of the raw materials in intimate contact and has the desired composition, appears to be of primary importance in the attainment of rapid vitrification and melting. The size range appears to be optimum with respect to the retention of adequate heat conductivity so that the vitrification process is not significantly retarded. It is a significant characteristic of the pellets that they have high heat conductivity, wherefore the heat from the flame in the melting chamber requires the shortest possible time entirely to penetrate into the pellets within the given size range.

Furthermore, the crushing strength and handling characteristics of the pellets are highly satisfactory for commercial operations. Without adequate resistance to crushing, the pellets would disintegrate to fine powders and create the problems and disadvantages described previously. Pellets in accordance with this invention have adequate crushing strength for easy handling as well as for ready transfer and storage of the pellets without dusting or segregation of ingredients.

It should be noted that the prior preparation of briquettes or sintered lumps of the raw materials has not passed beyond the experimental stage, and has largely been discontinued not only because the anticipated increase in the speed of melting and vitrification has not been obtained, but also because of the high expense and other disadvantages entailed. A further disadvantage of prior art proposals for briquetting was the requirement for extraneous binders such as inorganic salts, for example, metal silicates or phosphates; or organic binders, such as phenolic resins.

Such extraneous binders are disadvantageous not only because of the added expense but particularly because the introduction of undesired impurities and heterogeneity into the resulting glass created added problems.

In preparing the pellets in accordance with the present invention, adequate binding of the ingredient particles is due to two factors, namely, the fine particle sizes and the use of caustic soda in addition to water.

The attainment of the above-described advantages has been substantiated in commercial operations in accordance with this invention. In one installation, for example, the output of a glass furnace was thereby increased from 130 metric tons per day to 180 metric tons per day. In another case, the output was thereby increased from 110 metric tons to 150 metric tons per day. The melting rate, defined as the ratio of furnace melting area to the output in metric tons of glass per day, can readily attain 2.4 square feet per ton per day. Likewise, the fuel consumption can be readily reduced to 150 liters of oil per ton of glass produced.

Thus, the present invention makes it possible to produce glass of improved quality at an increased capacity per unit melting area of the glass furnace. Furthermore, the storage and transfer of pellets is readily effected without any segregation of the ingredients and without the dispersion of dusts in the furnace or in the working surroundings. Extended commercial use in accordance with this invention has also confirmed the obtainment of satisfactory performance without any unusual attack on or impairment of the furnace refractories.

What is claimed is:

1. In the preparation of a melting-furnace charge for producing homogeneous glass, said charge including as main raw material ingredients silica, limestone, sodium carbonate and sodium hydroxide, the process of increasing the speed of vitrification of said charge comprising the steps of:
    (a) pulverizing said silica to particles finer than 0.25 millimeter, at least 60% thereof being finer than than about 0.15 millimeter;
    (b) pulverizing said limestone and sodium carbonate to particles finer than 0.42 millimeter, at least 65% thereof being finer than about 0.15 millimeter;
    (c) mixing said pulverized silica, limestone, and sodium carbonate;
    (d) adding water and sodium hydroxide to said mixed pulverized silica limestone, and sodium carbonate, said sodium hydroxide being added in a proportion furnishing at least 20% by weight of the total $Na_2O$ present in the final analysis of the glass;
    (e) further mixing the said pulverized silica, limestone, sodium carbonate, water and sodium hydroxide, said added water being in an amount whereby said mixed silica, limestone, sodium carbonate are further mixed in the presence of 12% to 20% by weight of water to obtain a moist mixture;
    (f) then successively discharging aggregates of said moist mixture to tumble repeatedly over one another whereby to form rounded pellets thereof the majority of said pellets having a size of about 4 millimeters to 20 millimeters;
    (g) then, drying said pellets at an initial heating temperature below 200° C. and at a final heating temperature not exceeding 700° C.; and,
    (h) recovering crush-resistant rounded tumble-formed pellets of substantially uniform composition and having a size of about 4 to 20 millimeters, said pellets being substantially free of any binder other than said glass-forming ingredients.

2. The process of claim 1, wherein said pellets are formed having a water content of about 15%.

3. The process of claim 1, wherein said pellets are dried at an initial temperature of 130° C. to 180° C.

4. In the preparation of a melting-furnace charge for producing homogeneous glass, said charge including as main raw material ingredients silica, limestone and sodium hydroxide, the process of increasing the speed of vitrification of said charge comprising the steps of:
    (a) pulveriving said silica to particles finer than 0.25 millimeter, at least 60% thereof being finer than about 0.15 millimeter;
    (b) pulverizing said limestone to particles finer than 0.42 millimeter, at least 65% thereof being finer than about 0.15 millimeter;
    (c) mixing said pulverized silica and limestone;
    (d) adding water and sodium hydroxide to said mixed pulverized silica and limestone, said sodium hydroxide being added in a proportion furnishing at least 20% by weight of the total $Na_2O$ present in the final analysis of the glass;
    (e) further mixing the said pulverized silica, limestone, water and sodium hydroxide, said added water being in an amount whereby said mixed silica and limestone are further mixed in the presence of 12% to 20% by weight of water to obtain a moist mixture;
    (f) successively discharging aggregates of said moist mixture to tumble repeatedly over one another whereby to form rounded pellets thereof, the majority of said pellets having a size of about 4 millimeters to 20 millimeters;
    (g) then drying said pellets at an initial heating temperature below 200° C. and at a final heating temperature not exceeding 700° C.; and
    (h) recovering crush-resistant rounded tumble-formed pellets of substantially uniform composition and having a size of about 4 to 20 millimeters, said pellets being substantially free of any binder other than said glass-forming ingredients.

References Cited

UNITED STATES PATENTS

| | | | |
|---|---|---|---|
| 2,220,750 | 11/1940 | Bair et al. | |
| 2,366,473 | 1/1945 | Bair | 106—52 |
| 2,552,495 | 5/1951 | Poole | 106—52 |
| 3,065,090 | 11/1962 | Hopkins | 106—52 |
| 3,451,831 | 6/1969 | Miche | 65—335 XR |
| 2,114,545 | 4/1938 | Slayter | 65—335 XR |
| 3,001,881 | 9/1961 | Slayter. | |
| 3,193,119 | 7/1965 | Blaine | 65—335 XR |
| 3,294,505 | 12/1966 | Garrison | 65—335 X |
| 3,234,034 | 2/1966 | Jasinski et al. | 65—27 XR |
| 3,291,585 | 12/1966 | Okamura | 65—27 XR |
| 3,294,555 | 12/1966 | Krinov | 65—27 XR |

FRANK W. MIGA, Primary Examiner

U.S. Cl. X.R.

65—18; 106—52, 134, 335